UNITED STATES PATENT OFFICE.

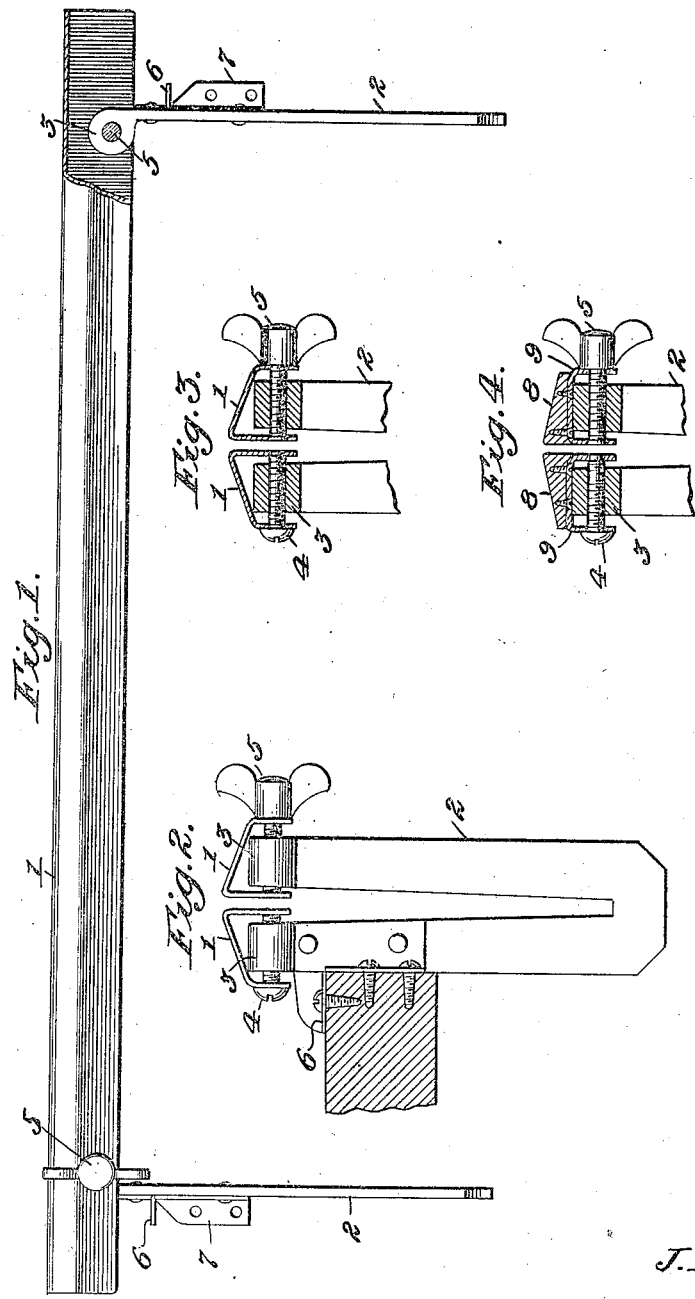

JAMES M. MAYS, OF PITTSBURGH, PENNSYLVANIA.

SAW CLAMP.

Application filed August 18, 1921. Serial No. 493,273.

*To all whom it may concern:*

Be it known that I, JAMES M. MAYS, a citizen of the United States, residing at Pittsburgh, in the county of Allegheny and State of Pennsylvania, have invented certain new and useful Improvements in Saw Clamps, of which the following is a full, clear, and exact description.

My invention relates to a saw clamp and has for its object to provide such a device which may be folded when not in use so as to be readily stored in a tool chest or the like.

Another object of the invention is to provide a saw clamp, which though foldable, is strong and durable in operation and is made of very few parts.

A further object of the invention is to provide such a device with means whereby it may be easily attached to a work bench, log or the like.

Other and further objects of the invention will be apparent from the following description when taken in connection with the accompanying drawing, in which:

Figure 1 is a front elevation of the clamp, a portion of one of the jaws being broken away to show the connection between the jaw and bracket.

Figure 2 is an end elevation of the clamp, the same being shown as attached to a work bench or other convenient support.

Figure 3 is a vertical section through the clamp in extended position, and

Figure 4 is a vertical section through a slightly modified form of clamp.

Referring to the drawing more in detail, the jaws of the clamp are designated by the numeral 1 and are substantially U-shaped in cross section. To the jaws 1 are pivotally connected the U-shaped brackets 2. Each leg of each of the brackets is formed with a bearing 3 through which is threaded the screws 4 and 5.

As shown in Figure 3 the end of the screw 5 is swiveled in the inner wall of one of the jaws. By turning this screw the jaw may be moved toward or away from the opposing jaw, for clamping or releasing the saw. Each of the brackets is provided with the flanges 6 and 7 formed with a suitable number of openings for the reception of screws, nails or the like, whereby the clamp may be attached to a suitable support.

The modified form shown in Figure 4 is identical with the foregoing structure except that I have substituted the wooden jaws 8—8 for the metal jaws above described. U-shaped metal clips 9 are secured to the base of the wooden jaws and receive the screws 4 and 5 in a manner already described. It will be clearly seen that in this form of the invention no metal whatever can come in contact with the saw.

Having fully described my invention, what I claim as new and desire to secure by Letters Patent is:

1. In a saw clamp the combination of a pair of jaws, outwardly extending projections on said jaws, a pair of brackets, means pivotally connecting the jaws to the brackets, said means including a screw swiveled in the outwardly extending projection and adapted to move one jaw with respect to the other.

2. In a saw clamp the combination of a pair of jaws, a pair of U-shaped brackets, bearings in the ends of said brackets, means extending through said bearings for pivoting the jaws thereto, said means including a screw swiveled on one of the jaws and adapted to move it with respect to the other, and means for attaching said brackets to a support.

JAMES M. MAYS.